United States Patent [19]

Greve

[11] Patent Number: 5,685,956
[45] Date of Patent: Nov. 11, 1997

[54] METHOD AND APPARATUS FOR BINDING FIBERS IN A FIBER REINFORCED PREFORM

[75] Inventor: Bruce Norman Greve, Clarkston, Mich.

[73] Assignee: The Budd Company, Troy, Mich.

[21] Appl. No.: 162,455

[22] Filed: Dec. 3, 1993

Related U.S. Application Data

[63] Continuation-in-part of Ser. No. 881,851, May 12, 1992, Pat. No. 5,286,326.

[51] Int. Cl.$^6$ .................................................. D21J 3/00
[52] U.S. Cl. ............................................. 162/396; 162/226
[58] Field of Search ............................... 264/122, 86, 87; 162/228, 396, 416, 226, 227; 425/85, 86

[56] References Cited

U.S. PATENT DOCUMENTS

| | | | |
|---|---|---|---|
| 1,342,184 | 6/1920 | Rauer | 162/226 |
| 1,549,903 | 8/1925 | Buel | 162/226 |
| 1,676,798 | 7/1928 | O'Brien. | |
| 1,725,465 | 8/1929 | Manson | 162/192 |
| 2,393,541 | 1/1946 | Kohler. | |
| 2,471,932 | 5/1949 | Chaplin | 162/416 |
| 2,476,282 | 7/1949 | Castellan | 162/146 |
| 2,526,125 | 10/1950 | Francis | 162/146 |
| 2,780,147 | 2/1957 | Richter et al. | 162/416 |
| 2,962,762 | 12/1960 | Hartmann et al. . | |
| 3,014,835 | 12/1961 | Feigley, Jr. et al. . | |
| 3,325,349 | 6/1967 | Reifers . | |
| 3,373,079 | 3/1968 | Eastmans et al. | 162/416 |
| 3,442,757 | 5/1969 | Williams . | |
| 3,449,207 | 6/1969 | Modersohn . | |
| 3,954,555 | 5/1976 | Kole et al. | 162/136 |
| 4,162,935 | 7/1979 | Kollmann et al. . | |
| 4,204,907 | 5/1980 | Korklan et al. . | |
| 4,647,415 | 3/1987 | Schafft . | |
| 4,740,346 | 4/1988 | Freeman . | |
| 4,769,274 | 9/1988 | Tellrik et al. | 162/146 |
| 4,775,705 | 10/1988 | Parker et al. . | |
| 4,812,283 | 3/1989 | Farley et al. . | |
| 4,818,448 | 4/1989 | Wrenn, Jr. et al. . | |
| 4,849,147 | 7/1989 | Freeman . | |
| 4,863,771 | 9/1989 | Freeman . | |
| 5,039,465 | 8/1991 | Freeman et al. . | |

FOREIGN PATENT DOCUMENTS

| | | | |
|---|---|---|---|
| 587989 | 12/1959 | Canada . | |
| 47-7726 | 3/1972 | Japan . | |
| 1511185 | 5/1978 | United Kingdom | 162/228 |

OTHER PUBLICATIONS

Jack K. Rogers, "Structural Composites: Moving the Dream Closer to Reality", Plastics Technology, Sep. 1989, pp. 108–117.

"Man–Made Fibers, Manufacture", Encyclopedia of Polymer Science and Technology, vol. 8, John Wiley and Sons, 1968, pp. 374–404.

"Manufactured Fiber", McGraw Hill Encyclopedia of Science and Technology, vol. 10, 6th Edition, 1987, pp. 375–380.

J.A. Keown and R.W. Curtis, "Wet Slurry Proces Brings Precision To Reinforced Plastics".

*Primary Examiner*—Brenda A. Lamb
*Attorney, Agent, or Firm*—Harness, Dickey & Pierce, P.L.C.

[57] ABSTRACT

A method and apparatus for binding the fibers of a fiber reinforced plastic preform. A fiber reinforced plastic preform is created in a preselected geometry from a mixture of reinforcing fibers and binding material. The fiber reinforced plastic preform is sequentially exposed to high temperature steam and cool air causing the binding material first to melt and, thereafter, to solidify thus binding and locking the reinforcing fibers of the preform in place. The fiber reinforced plastic preform is ejected from the apparatus by air pressure and is retrieved by any suitable method.

29 Claims, 4 Drawing Sheets

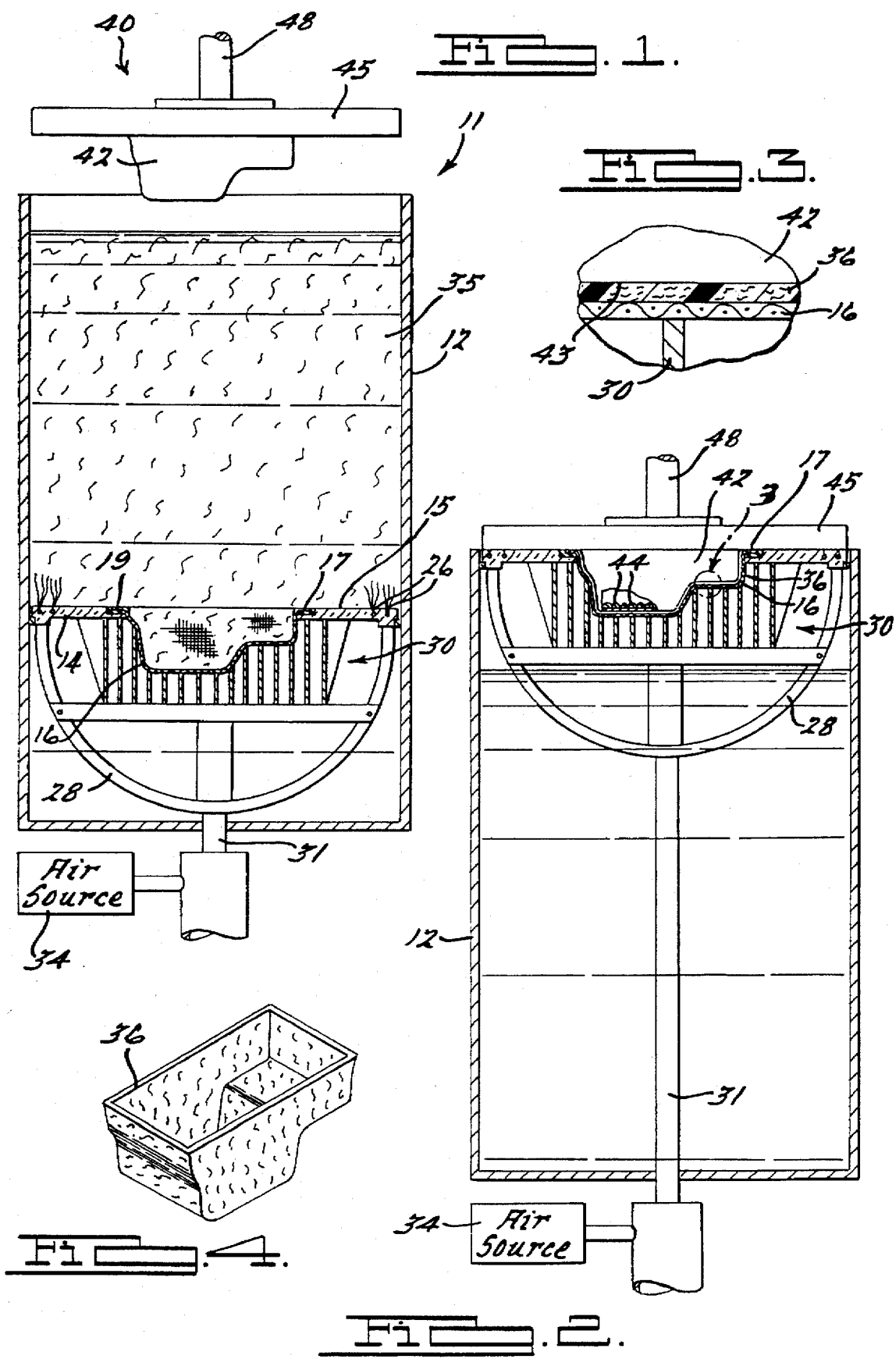

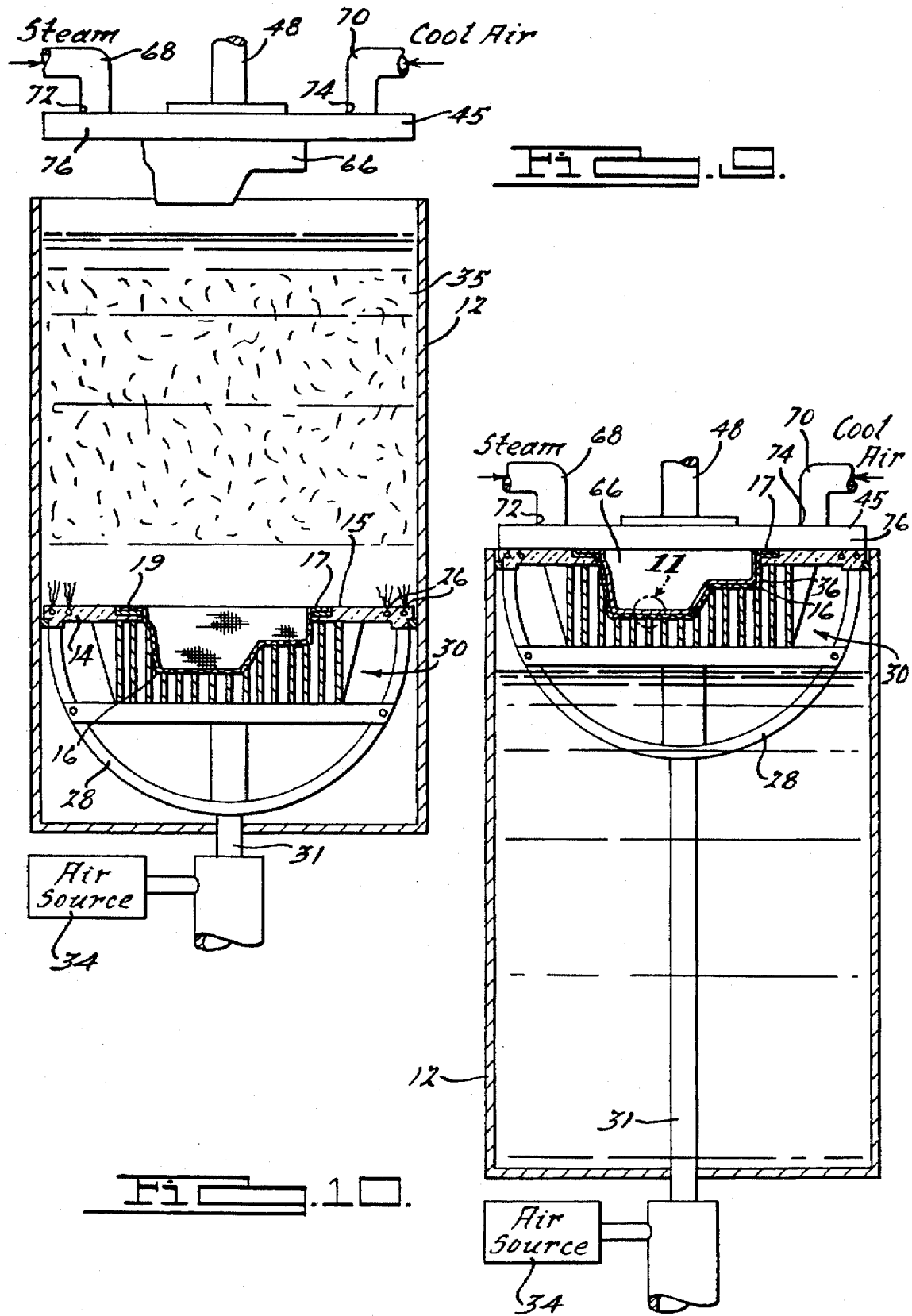

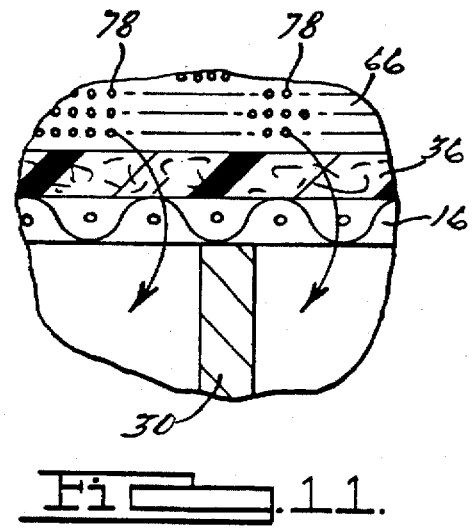
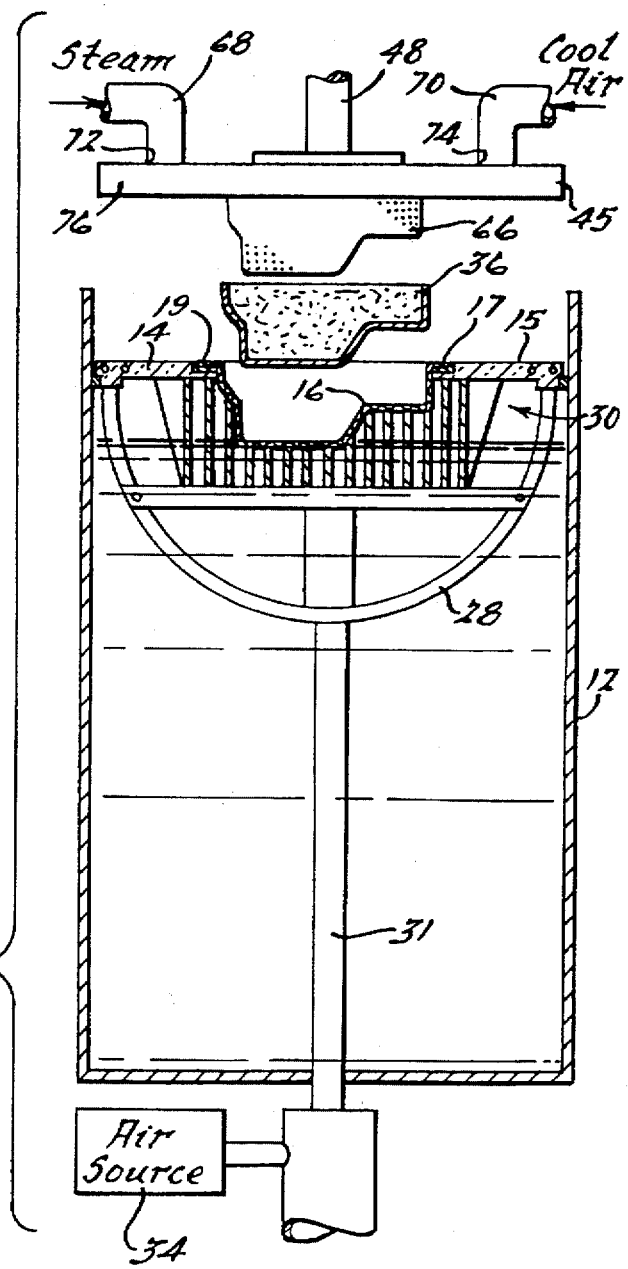

METHOD AND APPARATUS FOR BINDING FIBERS IN A FIBER REINFORCED PREFORM

This is a continuation-in-part application of U. S. patent application Ser. No. 881,851 filed May 12, 1992, entitled "Method for Binding Fibers in a Fiber Reinforced Preform Using an Electromagnetic Field to Melt Binding Fibers" now U.S. Pat. No. 5,286,326.

BACKGROUND OF THE INVENTION

The present invention relates generally to forming fiber reinforced plastic preforms and, more particularly, to a method and apparatus for binding the fibers of a fiber reinforced plastic preform.

Fiber reinforced plastic (FRP) parts or composite parts are well known and used in a wide variety of applications. An FRP part generally consists of a plastic shape in which carbon, fiberglass, or other reinforcing fibers are dispersed in order to provide strength to the plastic. One method of making an FRP part is known as resin transfer molding (RTM). In RTM, fibrous material in a mold is injected with resin which cures to form the part. Examples of these techniques are disclosed in commonly assigned U.S. Pat. Nos. 4,740,346; 4,849,147; and 4,863,771 which are hereby incorporated by reference. In RTM, fibrous material is often formed into a preliminary shape before being placed into the mold. The shaped sections generally conform to the shape of adjacent mold die surfaces and are known as preforms. Preforms have been made in several different manners. One approach is to direct chopped fibers by means of a flow of air onto a screen. One problem with this technique is that it is difficult to obtain desired fiber orientation. Another method is to make the preforms from mats of fibrous material. This method however results in undesirable amounts of scrap and is labor intensive thus resulting in production cost inefficiencies. Still another technique known as a wet slurry process is disclosed, for example, in Keown et al., "Wet Slurry Process Brings Precision To Reinforced Plastics". As discussed therein, a slurry containing chopped glass strands or fibers is drawn by vacuum into a chamber covered by a screen. As a result the fibers are deposited on the screen. This approach, however, also has some drawbacks. For example, it is somewhat difficult to consistently obtain the desired fiber orientation and compactness or density of the fibers using this equipment. In addition, the pumps and other equipment required to create the vacuum and draw the slurry through the screen may be unduly complex and difficult to maintain. Furthermore, the process is relatively slow. An improved wet slurry process is disclosed in commonly assigned U.S. Pat. No. 5,039,465, which is also hereby incorporated by reference. The process disclosed therein teaches drawing the slurry through the screen by raising the screen through a tank containing a slurry of fibers resulting in the fibers being deposited on the screen. Further disclosed are unique configurations for the holes in the screen to direct the fibers into desired orientations.

Of concern in any preform forming process is handling the fiber preform without disturbing the shape of the preform or the orientation of the fibers. To this end, commonly assigned U.S. Ser. No. 881,851 discloses that a binding material may be deposited along with the fibers when forming the preform. The binding material gives the preform sufficient strength to allow for handling without disturbing its shape or the orientation of the fibers. In typical applications, the binding material is a thermoplastic fiber mixed into the slurry with the reinforcing fibers in a wet slurry process or blown onto the screen along with the reinforcing fibers if an air blown process is used.

After the preform is shaped, the preform, still on the screen, is placed into an oven where it is heated thus melting the thermoplastic fibers and binding the reinforcing fibers. Once cooled, the preform can be removed from the screen and handled without damaging it. However, this heating and cooling process, often taking several hours, requires the use of many screens, large ovens, and is very time consuming.

SUMMARY OF THE INVENTION

Pursuant to the present invention an efficient, low cost method and apparatus for binding the fibers in a fiber reinforced preform is provided. In a preferred embodiment of the method, a screen shaped to the desired preform configuration is placed on a frame at the bottom of a water filled tank. Chopped reinforcing fibers and binding material are then added to the water to create a slurry. The frame and screen are then raised to the top of the tank causing the reinforcing fibers and the binding material to be deposited on the screen in the shape of the preform. Steam is introduced at a sufficiently high temperature and for a sufficient amount of time to melt the binding material. Cool air is then introduced to solidify the binding material and bind the reinforcing fibers of the preform. The preform then can be readily removed from the screen and handled without concern for damaging it.

BRIEF DESCRIPTION OF THE DRAWINGS

The various advantages of the present invention will become apparent to one skilled in the art after reading the following specification and by reference to the drawings in which:

FIG. 1 is a front cross-sectional view taken along the lines 1—1 of FIG. 5 of a fiber reinforced plastic preform forming apparatus of the present invention with the screen positioned at the bottom of the tank;

FIG. 2 is a view of a fiber reinforced plastic preform forming apparatus of the present invention after the screen has been raised to the top of the tank and an electromagnetic field generator is moved into close proximity to the fiber reinforced plastic preform;

FIG. 3 is an enlarged partial cross-sectional view of the apparatus showing the electromagnetic field generator in contact with and compressing the fibers of the fiber reinforced plastic preform as deposited on the contoured screen;

FIG. 4 is a perspective view of a fiber reinforced plastic preform of the present invention;

FIG. 9 is a front cross-sectional view similar to FIG. 1 of a fiber reinforced plastic preform forming apparatus according to a second embodiment of the present invention with the removable contoured first screen positioned at the bottom of the tank;

FIG. 10 is a view of a fiber reinforced plastic preform forming apparatus of the second embodiment of the present invention after the first screen has been raised to the top of the tank and a second screen is moved into close proximity to the fiber reinforced plastic preform;

FIG. 11 is an enlarged partial cross-sectional view of the apparatus showing the second screen in contact with and compressing the reinforcing fibers and the binding material of the fiber reinforced plastic preform on the first screen; and FIG. 12 is a view similar to FIG. 10 with the second screen retracted from the fiber reinforced plastic preform, and the fiber reinforced plastic preform removed from the first screen according to a second preferred embodiment of the present invention.

DESCRIPTION OF THE PREFERRED EMBODIMENTS

Figure 7:
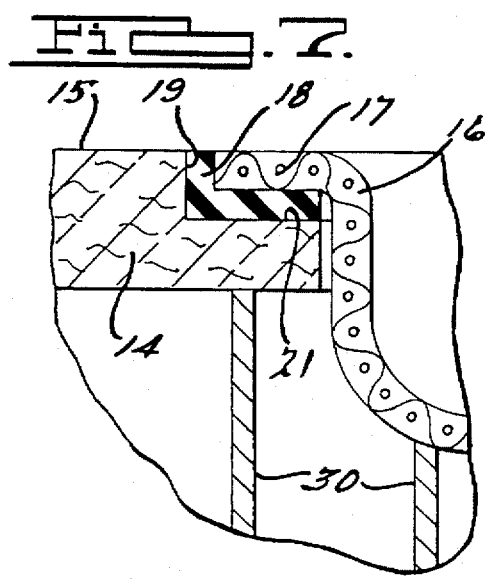
FIG. 7 is an enlarged partial cross-sectional view of the apparatus showing the screen mounting into a mask and matrix subframe.

It should be understood from the outset that the scope of the present invention need not be limited to the particular examples used in connection with this invention since those skilled in the art will appreciate that its teachings can be used in a wide variety of applications. With this caveat in mind, the present invention will be described for exemplary purposes embodied in a wet slurry process an example of which is disclosed in the aforementioned commonly assigned U.S. Pat. No. 5,039,465. With reference then to FIGS. 1 and 7, a contoured screen 16 having a defined geometry and containing openings of a preselected pattern has been placed in an aperture 19 formed in the surface of mask 14. The inner portion of mask 14 defining aperture 19 is provided with an offset or rabbetted surface 21 allowing seal 18 and a radially extending lip 17 of screen 16 to fit flush to planar surface 15 of mask 14. Mask 14 and screen 16 are shown supported by frame member 28 and matrix subframe 30. The subframe 30 is a grid of vertically extending metal bars and horizontally extending cross members. The top portion of matrix subframe 30 is suitably contoured to substantially match the contoured shape of screen 16 and thereby provide support over the entire surface area of screen 16. The bottom portion of subframe 30 is in contact with and suitably connected to frame member 28 thereby receiving support. As can best be seen in FIG. 5, matrix subframe 30 defines a plurality of openings 31 for allowing liquid passing through contoured screen 16 to further pass substantially unobstructed through matrix subframe 30.

As shown in FIG. 1, contoured screen 16 is initially positioned at the bottom of tank 12. Tank 12 is then filled with water and chopped reinforcing fibers such as glass, graphite, polyester or other suitable reinforcing fibers are added to create a slurry 35. Typically, the reinforcing fibers will be in bundles having approximately 500 filaments and a diameter of 2.5 to 25 microns with the bundles cut into one half to six inch lengths. Further added to slurry 35 are the binding fibers 50 of the present invention. Preferably, the binding fibers comprise approximately about 3-10 and, preferably, 6 percent by weight of the total weight of the fibers added to create slurry 35.

Figure 8:
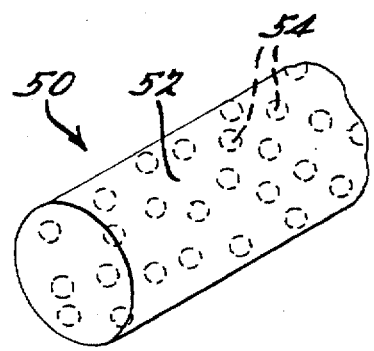
FIG. 8 is a perspective view of a binder fiber made in accordance with the teachings of the present invention showing a matrix material with a dispersion of ferromagnetic particles.

An exemplary embodiment of the binding fiber 50 of the present invention is shown in FIG. 8 as a matrix 52 of thermoplastic material having therein dispersed a quantity of filler material 54 having ferromagnetic properties. The matrix material 52 may be any of the thermoplastic materials, such as thermoplastic polyester, polypropylene, polyethylene, or nylon, suitable for forming into fibers. The filler material may be any ferromagnetic material which may be made into small particles to be dispersed into the thermoplastic matrix. Several types of suitable ferromagnetic materials are discussed in U.S. Pat. No. 2,393,541 (hereby incorporated by reference) and include iron, nickel, cobalt and their respective ferromagnetic alloys and oxides. In the preferred embodiment, the fiber 50 would consist of a thermoplastic polyester material with a 5–20 percent by weight dispersion of iron oxide particles having an irregular spherical shape approximately about 0.5–5 microns in diameter. When exposed to a high-frequency electromagnetic field, the filler material 54 produces heat which then melts the thermoplastic material 52 binding the reinforcing fibers of the fiber preform in place. The fibers 50 can be made by melting a mass of thermoplastic material, adding thereto a mass of ferromagnetic material, mixing them to create a homogenous mixture, extruding the mixture through a spinnerette or other suitable device and spinning or drawing to a predetermined diameter. The fiber may then be cut to length. In the present invention, the fiber is preferably 25–50 microns in diameter and cut approximately about 0.25–1.25 inch lengths.

Figure 5:
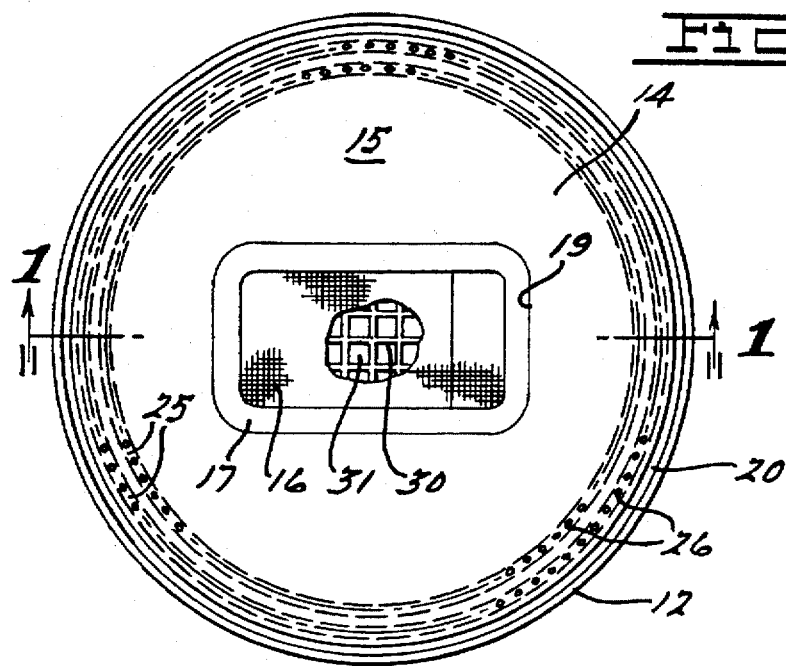
FIG. 5 is a top view of the apparatus partially broken away to further illustrate the matrix subframe structure.

With reference once again to FIGS. 1 and 2, contoured screen 16, mask 14 and frame 28 are raised to the top of tank 12 by activating a piston 31 attached to frame 28. In raising screen 16 to the top of tank 12 it is desirable to raise screen 16 quickly enough to create a partial vacuum on the underside of screen 16. This partial vacuum accompanied with the atmospheric pressure bearing down on the portion of slurry 35 above screen 16 cause the flow of slurry 35 through contoured screen 16 and the deposition of fibers onto the screen. The slurry is prevented from passing between mask 14 and walls of tank 12 by seal 20. This pressure differential, however, is equalized when any portion of mask 14 or screen 16 breaks the surface of slurry 35 thereby stopping the flow of slurry 35 through screen 16. It is therefore advantageous to maintain screen 16 below the surface of slurry 35 as long as possible. As can be seen in FIGS. 2 and 5, planar surface 15 of mask 14 is shown extending from the outer walls of tank 12 inwardly to aperture 19. Thus planar surface 15 of mask 14 allows for the pressure differential to be maintained for the maximum period of time by substantially maintaining all portions of screen 16 and mask 14 below the surface of slurry 35 until screen 16 reaches the top of tank 12. In raising screen 16 to the top of the tank, planar surface 15 further advantageously provides a smooth, unobstructed surface over which substantially all of the fibers of slurry 35 may be swept into contoured screen 16. Another advantage of mask 14 and planar surface 15 is demonstrated by the provision for mixing the reinforcing fibers.

Figure 6:
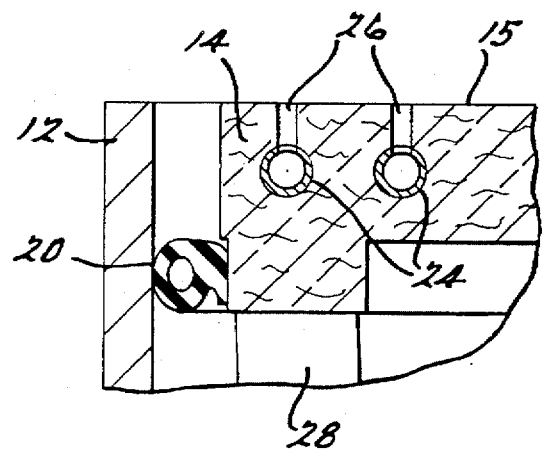
FIG. 6 is an enlarged partial cross-sectional view of the apparatus showing the seal and bubbler apparatus in particular detail.

As can be seen in FIGS. 5 and 6, embedded in mask 14 below planar surface 15 is a plurality of bubbler tubes 24 connected to the surface of mask 14 by a plurality of apertures 26 formed in mask 14. Air is advantageously conducted to bubbler tubes 24 from an air source 34 through hollow piston rod 31 and suitable connections to conduct air from hollow piston rod 31 to bubbler tubes 24. Air provided to bubbler tubes 24 is then conducted into tank 12 via apertures 26. In this manner slurry 35 is agitated directly above planar surface 15 thus assuring an even distribution of the reinforcing and binding fibers in slurry 35 and further improving the flow of slurry 35 over planar surface 15 to contoured screen 16.

FIGS. 2 and 3 show one embodiment of the present apparatus in its finished position. Once raised to the top of tank 12 the reinforcing fibers and binding fibers of slurry 35 are deposited on contoured screen 16 in the desired preformed shape 36. High frequency electromagnetic field generator 40 is then lowered into close proximity with fiber preform 36. In this embodiment, high frequency electromagnetic field generator 40 has a contoured plug 42 of substantially the same shape as preform 36 mounted to a base 45. Embedded near the surface 43 of plug 42 are a plurality of electromagnetic induction coils 44. Thus, when lowered under the action of piston 48, plug 42 slightly compacts the fibers of preform 36 as a high frequency electromagnetic field is generated thereby melting the thermoplastic binding fibers and binding the reinforcing fibers of preform 36. In the present invention, the high frequency electromagnetic field is generated by a suitable control source (not shown) in the range of 2 KHz to 2 MHz with a typical application consisting of 1 MHz field active for approximately about 2–15, and preferably about 5 seconds.

While all of the theoretical technical details of the binding action of the present invention are not completely understood, it is believed that the heating of the binding fibers 50 by the electromagnetic field raises the temperature in the immediate area to cause localized vaporization of any water droplets adjacent to the binding fibers. In addition, the heat of the binding fibers, during application of the electromagnetic field, may cause water droplets to be driven away from the hot binding fibers thereby allowing the binding fibers to melt and act as an adhesive to bind together adjacent reinforcing fibers. When the electromagnetic field is removed, the water droplets in the vicinity tend to return to their original location due to capillary action thereby quenching the hot binding fibers to cool and solidify them. Accordingly, the electromagnetic field need be applied only for a limited period of time in order to transform the wet, unmanageable raw preform into an easily handled unit characterized by a rigid structure in which substantially all of the reinforcing fibers are locked into place.

Once the reinforcing fibers of preform 36 have been bound together, preform 36 may be removed from contoured screen 16 by any suitable method. An exemplary preform made in accordance with the teachings of the present invention is illustrated in FIG. 4. In practice of the invention, contoured screen 16 would be suitably coated with Teflon® or other anti-sticking compound so as to prevent sticking of preform 36 to contoured screen 16 thereby improving the removal process. The removed preform then can be subjected to a drying process to remove residual water from the preform. This can be accomplished in a variety of manners such as forced air convection drying and other suitable methods which would be compatible with the teachings of the present invention. Once preform 36 is dried, a fiber reinforced part is created by placing the preform in a mold and injecting resin into the mold. The resin impregnates the fibers of the preform thereby forming the desired structure.

FIGS. 9–12 show a second embodiment of the present invention. Like reference numerals are used to identify like elements of the preceding embodiment.

As shown in FIG. 9, contoured screen 16 is initially positioned at the bottom of tank 12. Tank 12 is then filled with water and chopped reinforcing fibers to create a slurry 35. Further added to slurry 35 is binding material. An exemplary embodiment of the binding material of the present invention is a matrix of thermoplastic material, and preferably, thermoplastic fibers. The matrix material may be any of the thermoplastic materials, such as thermoplastic polyester, polypropylene, polyethylene, or nylon, suitable for forming into fibers. In the preferred embodiment, the binding material would consist of a thermoplastic polyester material, which melts when exposed to high temperature steam. When exposed to cool air, the melted thermoplastic fibers solidify binding and locking the reinforcing fibers of the fiber reinforced preform in place. The thermoplastic fibers can be made by melting a mass of thermoplastic material, extruding it through a spinnerette or other suitable device and spinning or drawing to a predetermined diameter. The fibers may then be cut to length. In the preferred embodiment of the present invention, the fibers are preferably 25–50 microns in diameter and cut approximately about 0.25–1.25 inches in length.

With reference to FIGS. 9 and 10, removable contoured screen 16, mask 14 and frame 28 are raised to the top of tank 12 by activating a piston 31 attached to frame 28 in a similar manner as described in the prior embodiment.

FIGS. 10 and 11 show the present apparatus in its finished position. Once raised to the top of tank 12 the reinforcing fibers and binding material of slurry 35 are deposited on removable contoured screen 16 in the desired preformed shape 36. In this embodiment, a second contoured screen 66, substantially the same shape and size as the inside surface of preform 36 is mounted to base 45. Second screen 66 and base 45 are lowered under the action of piston 48. Second screen 66 nests within removable contoured screen 16 capturing and holding the reinforcing fibers and binding material in place. Second screen 66 and removable contoured screen 16 are forced together with sufficient pressure to compress the reinforcing fibers and binding material together and remove trapped water from the preform.

As further shown in FIGS. 9, 10, 11 and 12, high temperature steam inlet conduit 68 and cool air inlet conduit 70 are mounted to base 45. Base 45 contains a high temperature steam inlet conduit opening 72 therein to allow for passage of high temperature steam from high temperature steam conduit 68 to chamber 76 and to the inner surface of second screen 66. The high temperature steam is then discharged through a plurality of openings 78 formed in second screen 66 and through preform 36 formed on removable contoured screen 16. Base 45 also contains a cool air inlet conduit opening 74 therein to allow for passage of cool air from cool air inlet conduit 70 through base 45 to preform 36 in substantially the same manner.

In operation, removable contoured screen 16, reinforcing fibers, binding material and second screen 66 are exposed to high temperature steam. This high temperature steam is sufficiently hot (at least 150° C.) and is maintained for a sufficient period of time (between 15 to 90 seconds) to melt the binding material. The heating of the binding material by the high temperature steam raises the temperature of the preform in the immediate area of the binding material causing vaporization of water droplets adjacent to the binding material. After the binding material is melted, removable contoured screen 16, reinforcing fibers, binding material and second screen 66 are exposed to a quantity of cool air (below about 150° C.) for about 10 to 30 seconds, sufficient enough to solidify the binding material and lock the reinforcing fibers in place. Accordingly, this high temperature steam and cool air combination need be applied only for a limited period of time in order to transform the wet, unmanageable raw preform into an easily handled unit characterized by a rigid structure in which substantially all of the reinforcing fibers are locked into place.

Once the reinforcing fibers of preform 36 have been bound together, second screen 66 is retracted to a position above tank 12. Removable contoured screen 16, mask 14 and frame 28 are then lowered into tank 12 whereby air in tank 12 trapped between the surface of the slurry and the bottom of mask 14 is forced through removable contoured screen 16 thereby causing preform 36 to be ejected from removable contoured screen 16. Ejected preform 36 may be retrieved by any suitable method. Retrieved preform 36 then can be subjected to a drying process to remove residual water. This can be accomplished in a variety of manners such as forced air convection drying and other suitable methods which would be compatible with the teachings of the present invention. Once preform 36 is dried, a fiber reinforced part is created by placing preform 36 in a mold and injecting resin into the mold, preferably using the above-described resin transfer molding (RTM) process. The resin impregnates the fibers of preform 36 thereby forming the desired structure.

The present invention provides a simple efficient method and apparatus for binding the fibers of a fiber reinforced plastic preform and further provides for a unique fiber construction for use with the present invention. It should be appreciated by those skilled in the art that modifications can be made without departing from the true spirit or fair scope of the present invention. The present invention will therefore be understood as susceptible to modification, alteration or variation by those skilled in the art without deviating from the scope of the invention as defined by the following claims.

What is claimed is:

1. An apparatus for forming fiber reinforced plastic preforms comprising:
   (a) a tank containing a slurry including a mixture of reinforcing fibers selected from the group comprising glass, graphite and polyester fibers, and binding fibers;
   (b) a contoured first screen supported within the tank;
   (c) means for translating the contoured first screen through the tank whereby the mixture is deposited on the contoured first screen in a mass;
   (d) a second member;
   (e) means for moving the second member adjacent to the mass on the contoured first screen;
   (f) means for heating the second member to transfer heat to the mass to cause the binding fibers to melt; and
   (g) means for thereafter cooling the second member to lower the temperature of the binding fibers to solidify the binding fibers about the reinforcing fibers to thereby form a relatively rigid fiber reinforced preform which can be removed from the screen while substantially maintaining its shape.

2. The apparatus of claim 1 further comprising means for removing the preform from the contoured first screen.

3. The apparatus of claim 2 wherein the tank includes a pocket of air and the means for removing the preform from the contoured first screen further comprises forcing the air through the first contoured screen thereby ejecting the preform from the first contoured screen.

4. The apparatus of claim 1 wherein the binding fibers comprise fibers that are meltable when exposed to high temperature steam and solidifyable when exposed to cool air.

5. The apparatus of claim 1 further comprising means for compressing the reinforcing fibers and the binding fibers together.

6. The apparatus of claim 4 further comprising means for passing high temperature steam and cool air from the second member through the contoured first screen and the mass to thereby melt and then solidify the binding fibers and bind the reinforcing fibers.

7. The apparatus of claim 6 wherein the means for passing high temperature steam and cool air comprises means for communicating high temperature steam and cool air to the contoured first screen.

8. An apparatus for forming fiber reinforced plastic preforms comprising:
   (a) a tank containing a slurry including a mixture of reinforcing fibers and binding fibers;
   (b) a contoured first screen supported within the tank;
   (c) means for translating the contoured first screen through the tank whereby the mixture is deposited on the contoured first screen in a mass;
   (d) a contoured second screen;
   (e) means for nesting the contoured second screen within the contoured first screen;
   (f) means for heating the contoured second screen to transfer heat to the mass to cause the binding fibers to melt; and
   (g) means for thereafter cooling the contoured second screen to lower the temperature of the binding fibers to solidify the binding fibers about the reinforcing fibers to thereby form a relatively rigid preform which can be removed from the contoured first screen while substantially maintaining its shape.

9. The apparatus of claim 8 wherein the contoured first screen is removable.

10. The apparatus of claim 8 wherein the binding fibers comprise fibers that are meltable when exposed to high temperature steam and solidifyable when exposed to cool air.

11. The apparatus of claim 8 wherein the contoured second screen further comprises a screen having a configuration similar to the contoured first screen, containing openings therein and being disposed above the tank.

12. The apparatus of claim 8 wherein the means for nesting the contoured second screen within the contoured first screen is further operable for compressing the reinforcing fibers and binding fibers between the contoured second screen and the contoured first screen.

13. The apparatus of claim 10 further comprising means for passing high temperature steam and cool air from the contoured second screen to thereby melt and then solidify the binding fibers to bind the reinforcing fibers.

14. The apparatus of claim 13 wherein the means for passing high temperature steam and cool air comprises a high temperature steam conduit, a cool air conduit and a chamber having a high temperature steam inlet and a cool air inlet formed therein whereby the high temperature steam conduit and the cool air conduit are in communication with the chamber and the chamber is in communication with the second contoured screen.

15. The apparatus of claim 8 further comprising means for removing the preform from the contoured first screen and the contoured second screen.

16. An apparatus for forming fiber reinforced plastic preforms comprising:
   (a) a tank having a top portion and a bottom portion, the tank containing a slurry of liquid, reinforcing fibers and binding fibers;
   (b) a removable contoured first screen having openings therein and being disposed within the tank;
   (c) a mask having an aperture therein in which the removable contoured first screen is located;
   (d) a matrix subframe secured below the mask and having a grid of vertically and horizontally extending bars, said matrix subframe having a plurality of openings and a contoured surface substantially matching the contour of the removable contoured first screen whereby the matrix subframe provides support over substantially the entire surface area of the removable contoured first screen while permitting a substantially non-disrupted flow of liquid through the removable contoured first screen;

(e) means for raising the matrix subframe vertically toward the top portion of the tank at a sufficient rate to create a downward force which causes the slurry of liquid to pass through the openings in the removable contoured first screen whereby the reinforcing fibers and binding fibers are deposited on the removable contoured first screen thereby forming a preform;

(f) a contoured second screen;

(g) means for positioning the contoured second screen adjacent to the preform; and (h) means for passing high temperature steam and cool air through the contoured second screen, the preform and the removable contoured first screen to thereby bind the reinforcing fibers in the preform.

17. The apparatus of claim 16 further comprising means for removing the preform from the removable contoured first screen and the contoured second screen.

18. The apparatus of claim 17 wherein the mask is sealed to the tank and when in the raised position a pocket of air exists within the tank and below the mask and the removable contoured first screen, and means for removal further comprises retracting the contoured second screen and lowering the mask and the removable contoured first screen into the tank whereby the air in the tank below the mask and the removable contoured first screen is forced through the removable contoured first screen thereby ejecting the preform from the removable contoured first screen.

19. The apparatus of claim 16 wherein the binding fibers comprise fibers that are meltable when exposed to high temperature steam and solidifyable when exposed to cool air.

20. The apparatus of claim 19 wherein said means for passing high temperature steam and cool air comprises the contoured second screen having a configuration similar to the removable contoured first screen, the contoured second screen containing openings therein and being disposed above the tank and means for nesting the contoured second screen within the removable contoured first screen capturing the reinforcing fibers and binding fibers.

21. The apparatus of claim 20 further comprising bubbler means for mixing the slurry of liquid, reinforcing fibers and binding fibers together to create a substantially even dispersion of the reinforcing fibers and the binding fibers in the slurry.

22. The apparatus of claim 16 further comprising bubbler means for mixing the slurry of liquid, reinforcing fibers and binding fibers together to create a substantially even dispersion of the reinforcing fibers and the binding fibers in the slurry, said bubbler means including a plurality of perforated tubes embedded within the mask, an air source, an air passageway from the air source to the perforated tubes, and the mask further having a plurality of perforations substantially aligned with the perforations in the perforated tubes for conducting air into the tank.

23. An apparatus for forming fiber reinforced plastic preforms comprising:

(a) a tank containing a slurry including a mixture of reinforcing fibers and binding fibers;

(b) a contoured first screen supported within the tank;

(c) means for translating the contoured first screen through the tank whereby the mixture is deposited on the contoured first screen in a mass;

(d) heating means for transferring heat to the mass to cause the binding fibers to melt;

(e) cooling means for thereafter cooling the mass to lower the temperature of the binding fibers to solidify the binding fibers about the reinforcing fibers to thereby form a relatively rigid preform which can be removed from the contoured first screen while substantially maintaining its shape; and (f) means for removing the fiber reinforced plastic preform from the contoured first screen, the cooling means being independent from the means for removing.

24. The apparatus of claim 23 further comprising compressing means for compressing the reinforcing fibers and the binding fibers together.

25. The apparatus of claim 23 wherein the heating means passes high temperature steam through the mass and wherein the cooling means passes cool air through the mass.

26. The apparatus of claim 25 wherein the binding fibers comprise comprises binding fibers that are meltable when exposed to high temperature steam and solidifyable when exposed to cool air.

27. The apparatus of claim 26 further comprising a contoured second member is disposed above the tank and operable to contact the mass on the first screen after the first screen has been translated through the tank.

28. The apparatus of claim 27 wherein the heating means comprises means for communicating high temperature steam to the contoured first screen and the cooling means comprises means for communicating cool air to the contoured first screen.

29. The apparatus of claim 23 wherein the tank includes a pocket of air and the means for removing the preform from the contoured first screen further comprises forcing the air through the contoured first screen thereby ejecting the preform from the contoured first screen.

* * * * *